US008582407B2

(12) United States Patent
Lee et al.

(10) Patent No.: US 8,582,407 B2
(45) Date of Patent: *Nov. 12, 2013

(54) INFORMATION RECORDING MEDIUM, APPARATUS FOR RECORDING AND/OR REPRODUCING DATA ON AND/OR FROM INFORMATION RECORDING MEDIUM, METHOD OF RECORDING AND/OR REPRODUCING DATA ON AND/OR FROM INFORMATION RECORDING MEDIUM, AND COMPUTER-READABLE RECORDING MEDIUM STORING PROGRAM FOR EXECUTING THE METHOD

(75) Inventors: Kyung-geun Lee, Seongnam-si (KR); Jung-wan Ko, Suwon-si (KR); Wook-yeon Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/959,756

(22) Filed: Dec. 19, 2007

(65) Prior Publication Data
US 2008/0094994 A1    Apr. 24, 2008

Related U.S. Application Data

(63) Continuation of application No. 11/063,984, filed on Feb. 24, 2005.

(30) Foreign Application Priority Data

Apr. 17, 2004    (KR) .................................. 2004-26395
Apr. 28, 2004    (KR) .................................. 2004-29590
Jun. 21, 2004    (KR) .................................. 2004-46050

(51) Int. Cl.
*G11B 7/00*    (2006.01)
(52) U.S. Cl.
USPC .................................... 369/53.21; 369/53.37

(58) Field of Classification Search
USPC ................. 720/729; 369/47.36, 47.49–47.52, 369/47.55, 53.2–53.22, 53.24
See application file for complete search history.

(56) References Cited

U.S. PATENT DOCUMENTS 5,233,576 A    8/1993    Curtis et al.
5,270,877 A    12/1993    Fukushima et al.
(Continued)

FOREIGN PATENT DOCUMENTS

EP    0 965 988    12/1999
EP    0 965 988 A2    12/1999
(Continued)

OTHER PUBLICATIONS

Office Action dated Jan. 29, 2008 of the Japanese Patent Application No. 2005-114873.
(Continued)

*Primary Examiner* — Nathan Danielsen
(74) *Attorney, Agent, or Firm* — NSIP Law

(57) ABSTRACT

An information recording medium includes a lead-in area, a user data area, and a lead-out area, wherein at least one of the lead-in or lead-out areas includes a compatibility information area in which compatibility information, specifying whether each area on the information recording medium is recordable and/or reproducible. The compatibility information may include state information on whether the user data area is recordable and/or reproducible, state information on whether the lead-in/lead-out area is recordable and/or reproducible, state information on whether the compatibility information area is recordable and/or reproducible, or state information on whether a defect management area (DMA) is recordable and/or reproducible. Accordingly, an existing drive or apparatus for recording and/or reproducing data on and/or from an information recording medium can smoothly record and/or reproduce data on an information recording medium that is of a higher version than the existing drive or apparatus.

4 Claims, 12 Drawing Sheets

(56) References Cited

U.S. PATENT DOCUMENTS

| | | | |
|---|---|---|---|
| 5,282,186 A * | 1/1994 | Yoshio et al. | 369/47.21 |
| 5,737,287 A | 4/1998 | Lee | |
| RE36,445 E * | 12/1999 | Miyagawa et al. | 369/53.23 |
| 6,288,989 B1 * | 9/2001 | Ro et al. | 369/47.13 |
| 6,330,210 B1 * | 12/2001 | Weirauch et al. | 369/47.15 |
| 6,377,526 B1 * | 4/2002 | Vining et al. | 369/53.1 |
| 6,434,107 B1 | 8/2002 | Artigalas et al. | |
| 6,519,410 B1 | 2/2003 | Okada et al. | |
| 6,671,249 B2 | 12/2003 | Horie | |
| 6,683,835 B2 | 1/2004 | Ko et al. | |
| 6,714,509 B2 | 3/2004 | Kumagai et al. | |
| 6,724,705 B1 | 4/2004 | Ko et al. | |
| 6,741,535 B2 | 5/2004 | Ko et al. | |
| 6,744,713 B1 | 6/2004 | Ko et al. | |
| 6,765,853 B1 | 7/2004 | Ko et al. | |
| 6,862,256 B2 | 3/2005 | Lee et al. | |
| 6,868,054 B1 | 3/2005 | Ko | |
| 7,046,605 B1 | 5/2006 | Ko | |
| 7,151,729 B1 | 12/2006 | Park et al. | |
| 7,280,740 B2 | 10/2007 | Nakahara et al. | |
| 7,746,737 B2 * | 6/2010 | Lee et al. | 369/47.1 |
| 2002/0048241 A1 | 4/2002 | Kumagai et al. | |
| 2002/0067673 A1 | 6/2002 | Ko et al. | |
| 2002/0075792 A1 * | 6/2002 | Ko et al. | 369/275.3 |
| 2002/0089919 A1 | 7/2002 | Ko et al. | |
| 2002/0176341 A1 | 11/2002 | Ko et al. | |
| 2003/0005241 A1 | 1/2003 | Ueno | |
| 2003/0227846 A1 | 12/2003 | Lee et al. | |
| 2004/0090904 A1 | 5/2004 | Lee et al. | |
| 2004/0095864 A1 | 5/2004 | Lee et al. | |
| 2004/0125738 A1 | 7/2004 | Lee et al. | |
| 2004/0190411 A1 | 9/2004 | Ko et al. | |
| 2004/0223446 A1 | 11/2004 | Lee | |
| 2004/0228238 A1 | 11/2004 | Ko et al. | |
| 2004/0228245 A1 | 11/2004 | Lee et al. | |
| 2004/0228253 A1 | 11/2004 | Lee | |
| 2005/0105441 A1 | 5/2005 | Lee | |
| 2005/0109441 A1 | 5/2005 | Sugiyama et al. | |
| 2005/0111324 A1 | 5/2005 | Ko et al. | |
| 2005/0111325 A1 | 5/2005 | Ko et al. | |
| 2005/0117485 A1 | 6/2005 | Ko et al. | |
| 2005/0117506 A1 | 6/2005 | Ko et al. | |
| 2005/0122870 A1 | 6/2005 | Hwang et al. | |
| 2005/0232092 A1 | 10/2005 | Lee et al. | |
| 2006/0227681 A1 | 10/2006 | Lee et al. | |
| 2008/0094989 A1 | 4/2008 | Lee et al. | |

FOREIGN PATENT DOCUMENTS

| | | |
|---|---|---|
| EP | 1 049 089 | 11/2000 |
| EP | 1 128 383 | 8/2001 |
| EP | 1 587 075 B1 | 7/2009 |
| JP | 11-283358 | 10/1999 |
| JP | 2000-322841 | 11/2000 |
| JP | 2002-149457 | 5/2002 |
| JP | 2002-197790 | 7/2002 |
| JP | 2003-331504 | 11/2003 |
| JP | 2004-501555 | 1/2004 |
| KR | 2000-5588 | 1/2000 |
| KR | 2000-0005588 A | 1/2000 |
| TW | 366488 | 8/1999 |
| TW | 528985 | 4/2003 |
| TW | 580697 | 3/2004 |
| WO | WO 00/57410 | 9/2000 |
| WO | WO 01/91052 | 11/2001 |
| WO | WO 03/102937 | 12/2003 |
| WO | WO 03/102937 A1 | 12/2003 |
| WO | WO 2004/017314 | 2/2004 |
| WO | WO 2004/017314 A1 | 2/2004 |
| WO | WO 2004/059648 | 7/2004 |
| WO | WO 2004/059648 A2 | 7/2004 |
| WO | WO 2004/072966 | 8/2004 |
| WO | WO 2004/072966 A1 | 8/2004 |
| WO | WO 2005/045811 | 5/2005 |
| WO | WO 2005/045811 A1 | 5/2005 |

OTHER PUBLICATIONS

Australian Patent Office Search Report and Examination Report issued Nov. 17, 2005 re: Application No. SG 200501968-2 (9pp).

Japanese Office Action issued in related Japanese Patent Application No. 2005-114873 on Mar. 17, 2009.

Preliminary Notice of the First Office Action dated Apr. 17, 2009 of the Taiwanese Patent Application No. 94108913.

Official Report dated Sep. 10, 2009 in related Indian Patent Application No. 1458/MUM/2006.

Search Report and Examination Report issued Nov. 17, 2005, in counterpart Singapore Application No. SG 200501968-2 by Australian Patent Office acting as National Patent Examining Authority for Intellectual Property Office of Singapore (9 pages).

U.S. Appl. No. 11/063,984, filed Feb. 24, 2005, Kyung-geun Lee et al., Samsung Electronics Co., Ltd.

U.S. Appl. No. 11/449,800, filed Jun. 9, 2006, Kyung-geun Lee et al., Samsung Electronics Co., Ltd.

U.S. Appl. No. 11/959,767, filed Dec. 19, 2007, Kyung-geun Lee et al., Samsung Electronics Co., Ltd.

U.S. Appl. No. 11/959,779, filed Dec. 19, 2007, Kyung-geun Lee et al., Samsung Electronics Co., Ltd.

U.S. Appl. No. 11/959,794, filed Dec. 19, 2007, Kyung-geun Lee et al., Samsung Electronics Co., Ltd.

Examiner's Report dated Mar. 30, 2012, in counterpart Malaysian Patent Application No. PI20051307 (in English, 5 pages).

* cited by examiner

FIG. 6
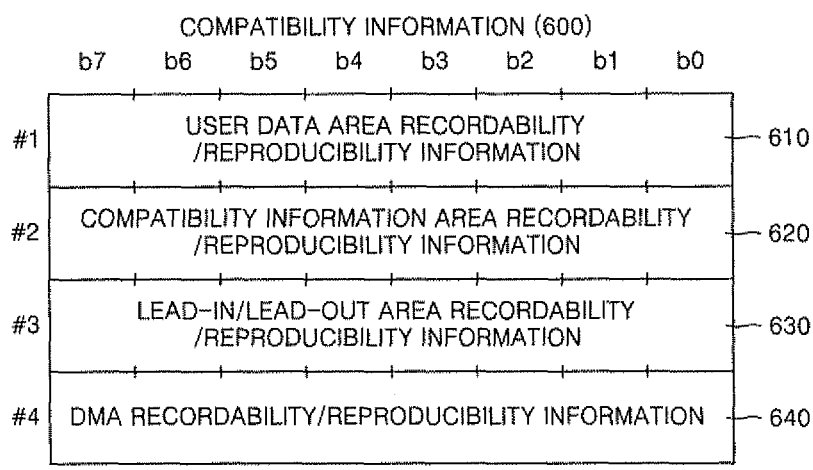
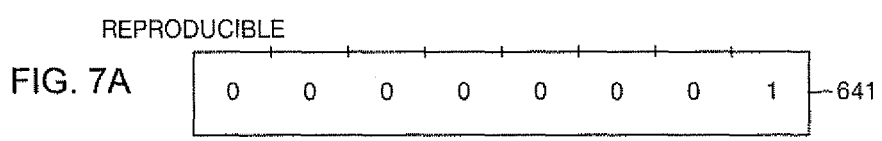
FIG. 7A
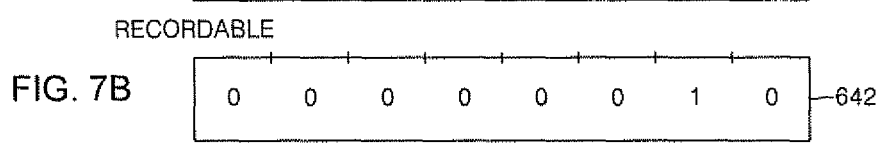
FIG. 7B
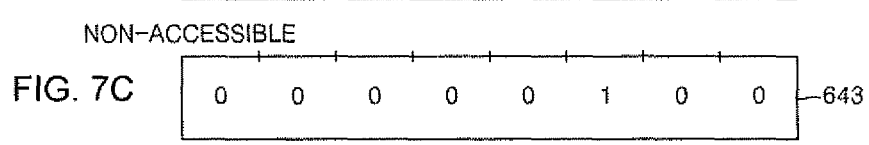
FIG. 7C

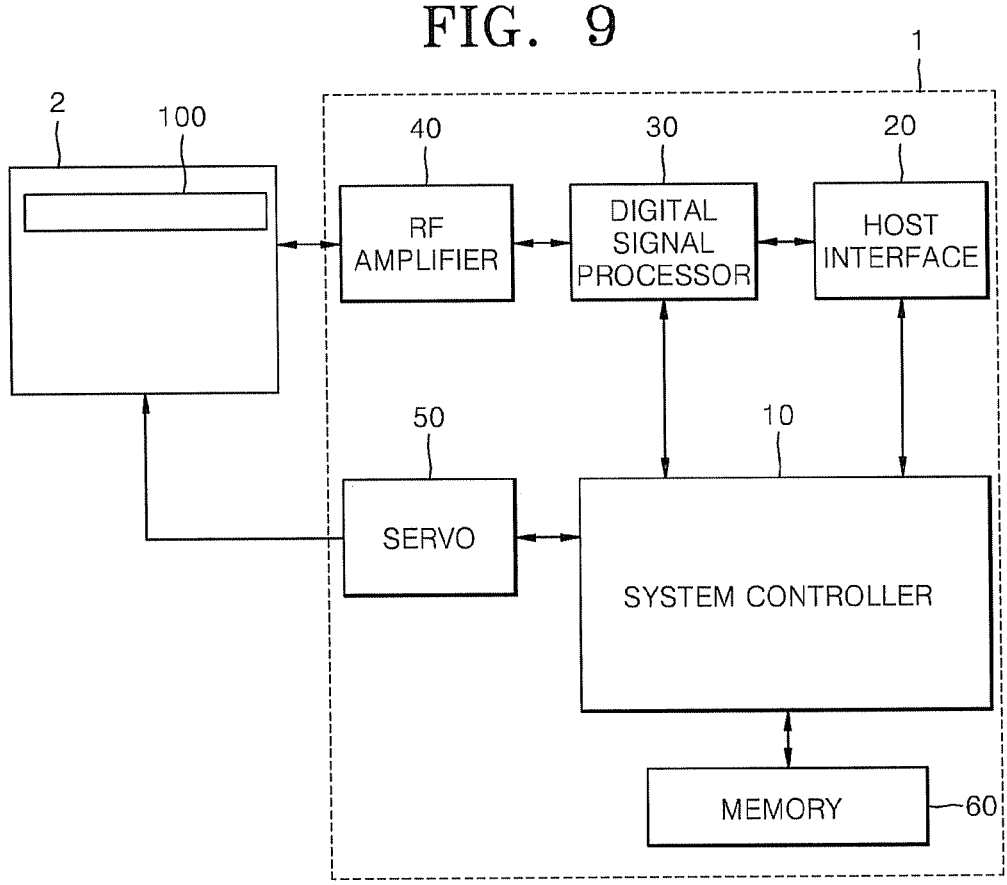

FIG. 12A

WRITE PROTECTION = ⟨WRITE INHIBIT HOLE OF CARTRIDGE / ENTIRE DISC⟩ OR ⟨WRITE PROTECTION FLAG INFORMATION IN DDS / ENTIRE DISC⟩ OR ⟨COMPATIBILITY INFORMATION AREA RECORDABILITY/REPRODUCIBILITY INFORMATION / EACH AREA ON DISC⟩

FIG. 12B

| WRITE INHIBIT HOLE OF CARTRIDGE | WRITE PROTECTION FLAG INFORMATION IN DDS | COMPATIBILITY INFORMATION AREA RECORDABILITY /REPRODUC- IBLITY INFORMATION | RECORDING OPERATION OF DRIVE |
|---|---|---|---|
| 0 | 0 | 0 | POSSIBLE |
| 0 | 0 | 1 | IMPOSSIBLE |
| 0 | 1 | 0 | IMPOSSIBLE |
| 0 | 1 | 1 | IMPOSSIBLE |
| 1 | 0 | 0 | IMPOSSIBLE |
| 1 | 0 | 1 | IMPOSSIBLE |
| 1 | 1 | 0 | IMPOSSIBLE |
| 1 | 1 | 1 | IMPOSSIBLE |

INFORMATION RECORDING MEDIUM, APPARATUS FOR RECORDING AND/OR REPRODUCING DATA ON AND/OR FROM INFORMATION RECORDING MEDIUM, METHOD OF RECORDING AND/OR REPRODUCING DATA ON AND/OR FROM INFORMATION RECORDING MEDIUM, AND COMPUTER-READABLE RECORDING MEDIUM STORING PROGRAM FOR EXECUTING THE METHOD

CROSS-REFERENCE TO RELATED APPLICATIONS

This application is a continuation of application Ser. No. 11/063,984 filed on Feb. 24, 2005, now pending, and claims the benefit of Korean Patent Application Nos. 2004-26395, 2004-29590, and 2004-46050 filed on Apr. 17, 2004, Apr. 28, 2004 and Jun. 21, 2004, respectively, in the Korean Intellectual Property Office, the disclosures of which are incorporated herein by reference.

BACKGROUND OF THE INVENTION

1. Field of the Invention

The present invention relates to an information recording medium, and more particularly, to an information recording medium having new functions and improved performance compared to existing data storage media and still completely compatible with an existing drive or apparatus for recording data on an information recording medium, a method of recording and/or reproducing data on/from an information recording medium, an apparatus for recording and/or reproducing data on/from an information recording medium, and a computer-readable recording medium, on which a program enabling the method is recorded.

2. Description of the Related Art

In general, optical data storage media, such as optical discs, are widely used in an optical pickup apparatus which records data on and/or reproduces data from the optical data storage media without physically contacting the optical data storage media. Optical discs are classified into compact discs (CDs) or digital versatile discs (DVDs) according to their storage capacities. Examples of an optical disc on which data can be recorded and from which data can be erased and reproduced include a 650 MB CD-R, a CD-rewritable (RW), a 4.7 GB DVD+R/RW, a DVD-random access memory (RAM), and a DVD-R/RW. Examples of an optical disc from which data can only be reproduced include a 650 MB CD and a 4.7 GB DVD-ROM. Also, the development of high density (HD) DVDs or Blu-ray (BD) discs with a storage capacity of at least 15 GB has been almost accomplished, and the development of super-resolution near-field structure (super RENS) discs or hologram discs with an even higher storage capacity than HD DVDs or BD discs is now under way.

Currently, research has been carried out on the design of recordable DVD standards, which provide newly developed data storage media with perfect compatibility with an existing drive or apparatus for recording data on an information recording medium in terms of data recording and reproducing. In particular, various efforts have been made to develop media technologies that can maintain excellent recording characteristics of the newly developed data storage media even at low recording speed and can enable the newly developed data storage media to be perfectly compatible with an existing drive or apparatus for recording data on an information recording medium. However, since there are various types of discs (e.g., a DVD-RAM, a DVD-RW, and a DVD-R), information indicating whether each of the various types of discs is recordable and/or reproducible should be specified somewhere on a corresponding disc, together with information on the recording speed of the corresponding disc.

FIG. 1 is a diagram illustrating why it is necessary to record compatibility information, specifying whether each area on the information recording medium is recordable and/or reproducible, on each information recording medium. Specifically, FIG. 1 illustrates three discs and three drives. Referring to FIG. 1 suppose that disc A, which has 1X recording speed and is used in drive A, is a disc of version 1, disc B, which has 1X-2X recording speed and is used in drive B, is a disc of version 2 developed by adding predetermined functions to the disc of version 1, and disc C, which has 1X-4X recording speed and is used in drive C, is a disc of version 3 developed by adding other predetermined functions to the disc of version 2. Sometimes, a user having the drive A may have to use a disc of a higher version than the disc A, e.g., the disc B or C. Since the disc B or C supports 1X recording speed, it may be compatible with the drive A theoretically. However, without knowing whether data can be recorded and/or reproduced on and/or from user data areas on discs B or C, it is difficult to record data on or reproduce data from discs B or C.

FIG. 2 is a diagram illustrating the structure of a conventional disc. Referring to FIG. 2, a lead-in area is disposed along the inner circumference of the conventional disc, a lead-out area is disposed along the outer circumference of the conventional disc, and a user data area, in which user data is recorded, is disposed between the lead-in area and the lead-out area.

The lead-in area includes a pre-recorded zone, on which predetermined data has already been written and from which the predetermined data cannot be erased but can only be reproduced, and a recordable zone, on which data can be written or overwritten and from which data can also be erased.

The pre-recorded zone is a control data area, in which control data is recorded. The control data includes information on the type, version, size, recording speed and recording parameters of the conventional disc.

The recordable zone includes a buffer area, a defect management area (DMA), a test area, and a conventional disc/conventional drive state information area.

The buffer area serves as a buffer between the pre-recorded zone and the recordable zone.

The DMA stores defect information, such as the addresses of replacement data that respectively replace defective data in the user data area. The DMA also stores a conventional disc definition structure (DDS), which is illustrated in FIG. 3. Referring to FIG. 3, the DDS includes conventional disc manufacturer authentication information, which is used for authenticating a conventional disc manufacturer, user authentication information, which is used for authenticating a conventional disc user, and a write protection flag, which prevents data from being recorded on a conventional disc.

The test area is tested for determining an optimum recording power for recording data in the user data area.

The conventional disc/conventional drive state information area stores information on the state of the conventional disc or a conventional drive.

Korean Patent Publication No. 2000-5588 submitted by the same applicant of the present invention, discloses a method of recording a write protection flag on a disc so that data can be prevented from being recorded on any area on the disc with the exception of a DMA, in which a result of testing a lead-in/lead-out area on the disc with the use of a drive and defect information are recorded. However, the DMA is of great importance because address information of replacement data, replacing defective data in a data area of the disc, is recorded in the DMA. Therefore, there is a need to mark the DMA as recordable and/or reproducible separately from the data area. In addition, it is possible to provide various recording and/or reproducing information areas on the disc by marking each area on the disc as recordable and/or reproducible.

Moreover, if a disc which is based on new disc standards and whose version is yet to be known is installed in a drive or apparatus for recording data on an information recording medium, a user may have difficulty deciding whether to record and/or reproduce data on and/or from the disc because it is difficult to determine whether the disc is recordable and/or reproducible.

SUMMARY OF THE INVENTION

According to an aspect of the present invention, there is provided an information recording medium having new functions and improved performance compared to existing data storage media and still completely compatible with an existing drive or apparatus for recording data on an information recording medium, a method of recording and/or reproducing data on and/or from an information recording medium, an apparatus for recording and/or reproducing data on and/or from an information recording medium, and a computer-readable recording medium storing a program enabling the method.

According to another aspect of the present invention, there is provided an information recording medium, which includes a lead-in area, a user data area, and a lead-out area. At least one of the lead-in area or the lead-out area includes a compatibility information area in which compatibility information, which specifies whether each area on the information recording medium is recordable and/or reproducible, is recorded.

According to another aspect of the present invention, the compatibility information may include at least one of state information on whether the user data area is recordable and/or reproducible, state information on whether the lead-in/lead-out area is recordable and/or reproducible, state information on whether the compatibility information area is recordable and/or reproducible, or state information on whether a defect management area (DMA) is recordable and/or reproducible. Here, the DMA stores information of defects that have occurred in the user data area.

According to yet another aspect of the present invention, the compatibility information may include at least one of state information on whether each area on the information recording medium is recordable, state information on whether each area on the information recording medium is reproducible or state information on whether each area on the information recording medium is accessible.

According to another aspect of the present invention, if the write protection flag is set when recording data on the information recording medium, the write protection flag may have priority over the compatibility information so that data can be prevented from being recorded on the information recording medium.

According to another aspect of the present invention, there is provided a method of recording and/or reproducing data on and/or from an information recording medium, which includes a lead-in area, a user data area, and a lead-out area. The method includes: reading compatibility information, which specifies whether each area on the information recording medium is recordable and/or reproducible, from at least one of the lead-in area or the lead-out area; and recording and/or reproducing data on and/or from the information recording medium with reference to the compatibility information.

According to an aspect of the present invention, the compatibility information may include at least one of state information on whether the user data area is recordable and/or reproducible, state information on whether the lead-in/lead-out area is recordable and/or reproducible, state information on whether the compatibility information area is recordable and/or reproducible, or state information on whether a defect management area (DMA) is recordable and/or reproducible. Here, the DMA stores information of defects that have occurred in the user data area.

According to another aspect of the present invention, the recording and/or reproducing data on and/or from the information recording medium may include transmitting an error message, indicating that the information recording medium is not recordable and/or reproducible, to a host, if the compatibility information indicates that the information recording medium is not recordable and/or reproducible.

According to another aspect of the present invention, the recording and/or reproducing data on and/or from the information recording medium, may include giving priority to the write protection flag over the compatibility information so that data can be prevented from being recorded on the information recording medium, if a write protection flag is set in the information recording medium when recording data on the information recording medium.

According to another aspect of the present invention, there is provided an apparatus for recording and/or reproducing data on and/or from an information recording medium, which includes a lead-in area, a user data area, and a lead-out area. The apparatus includes: a reading and/or writing unit, which writes and/or reads compatibility information, which specifies whether each area on the information recording medium is recordable and/or reproducible, in and/or from at least one of the lead-in area or the lead-out area; and a control unit, which controls the reading and/or writing unit to write and/or read data on and/or from the information recording medium with reference to the compatibility information.

According to another aspect of the present invention, the compatibility information may include at least one of state information on whether the user data area is recordable and/or reproducible, state information on whether the lead-in/lead-out area is recordable and/or reproducible, state information on whether the compatibility information area is recordable and/or reproducible, or state information on whether a defect management area (DMA) is recordable and/or reproducible. Here, the DMA stores information of defects that have occurred in the user data area.

According to another aspect of the present invention, the control unit may transmit an error message, indicating that the information recording medium is not recordable and/or reproducible, to a host, if the compatibility information indicates that the information recording medium is not recordable and/or reproducible.

According to another aspect of the present invention, the control unit may give priority to the write protection flag over the compatibility information so that data can be prevented from being recorded on the information recording medium, if a write protection flag is set in the information recording medium when recording data on the information recording medium.

According to another aspect of the present invention, there is provided a computer-readable recording medium, on which a program enabling a method of recording and/or reproducing data on and/or from an information recording medium is recorded. The method includes: reading compatibility information, which specifies whether each area on the information recording medium is recordable and/or reproducible, from the compatibility information defined in at least one of the lead-in area or the lead-out area; and recording and/or reproducing data on and/or from the information recording medium with reference to the compatibility information.

According to another aspect of the present invention, there is provided an information recording medium, which includes a lead-in area, a user data area, and a lead-out area. Here, at least one of the lead-in area or the lead-out area includes a compatibility information area in which compatibility information, which specifies whether each area on the information recording medium is recordable and/or reproducible, is recorded, and it is determined whether to record data on the information recording medium with reference to information on a write inhibit hole of a cartridge, in which the information recording medium is contained, a write protection flag recorded in a DMA in the lead-in or lead-out area, and the compatibility information.

According to another aspect of the present invention, if at least one of the write inhibit hole information, the write protection flag, or the compatibility information write-protects the information recording medium, data is prevented from being recorded on the information recording medium.

According to another aspect of the present invention, there is provided a method of recording and/or reproducing data on and/or from an information recording medium, which includes a lead-in area, a user data area, and a lead-out area. The method includes: reading compatibility information, which specifies whether each area on the information recording medium is recordable and/or reproducible, from at least one of the lead-in area or the lead-out area; and recording and/or reproducing data on and/or from the information recording medium with reference to write inhibit hole information of a cartridge in which the information recording medium is contained, a write protection flag recorded in a DMA in the lead-in or lead-out area, and the compatibility information.

According to another aspect of the present invention, the recording and/or reproducing data on and/or from the information recording medium, may include determining that data is prevented from being recorded on the information recording medium if at least one of the write inhibit hole information, the write protection flag, and the compatibility information write-protects the information recording medium.

According to another aspect of the present invention, there is provided an apparatus for recording and/or reproducing data on and/or from an information recording medium, which includes a lead-in area, a user data area, and a lead-out area. The apparatus includes: a reading and/or writing unit, which writes and/or reads compatibility information, which specifies whether each area on the information recording medium is recordable and/or reproducible, in and/or from at least one of the lead-in area or the lead-out area; and a control unit, which controls the reading and/or writing unit to write and/or read data on and/or from the information recording medium with reference to write inhibit hole information of a cartridge in which the information recording medium is contained, a write protection flag recorded in a DMA in the lead-in or lead-out area, and the compatibility information.

According to another aspect of the present invention, the control unit may determine that data is prevented from being recorded on the information recording medium if at least one of the write inhibit hole information, the write protection flag, and the compatibility information write-protects the information recording medium.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become more apparent and more readily appreciated from the following description of the embodiments, taken in conjunction with the attached drawings of which:

FIG. 6 is a diagram illustrating another example of the compatibility information of FIG. 4;

FIGS. 7A through 7C are diagrams illustrating information of FIG. 6 specifying whether a defect management area (DMA) is recordable and/or reproducible (hereinafter referred to as DMA recordability and/or reproducibility information);

FIG. 8 is a table showing whether a drive can record data on a disc according to a write protection flag recorded in a DDS of the disc and compatibility information specifying whether each area on the disc is recordable and/or reproducible;

FIG. 9 is a schematic block diagram of an apparatus for recording and/or reproducing data on and/or from an information recording medium, according to an embodiment of the present invention;

FIG. 12A is a diagram illustrating the relationship among information (hereinafter referred to as write inhibit hole information) on a write inhibit hole of a cartridge, a write protection flag recorded in a DDS of a disc, and compatibility information of the disc;

FIG. 12B is a table showing whether a drive can record data on a disc according to write inhibit hole information, a write protection flag recorded in a DDS of a disc, and compatibility information of the disc.

DETAILED DESCRIPTION OF THE EMBODIMENTS

Figure 1:
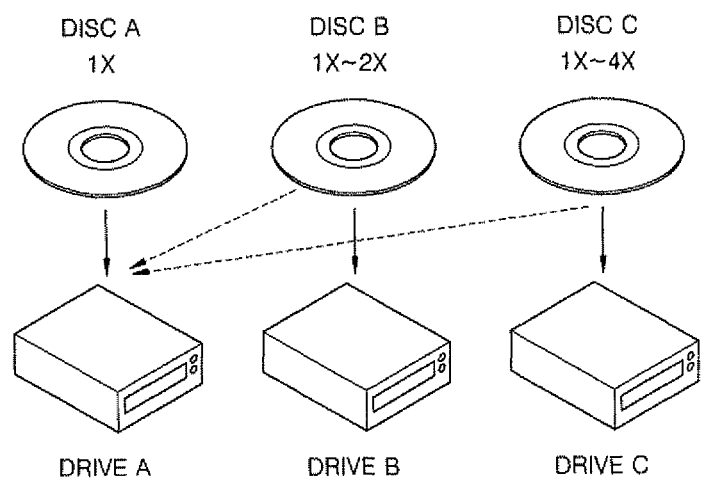
FIG. 1 is a diagram illustrating the necessity to record on each information recording medium compatibility information specifying whether each area on the information recording medium is recordable and/or reproducible.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 4:
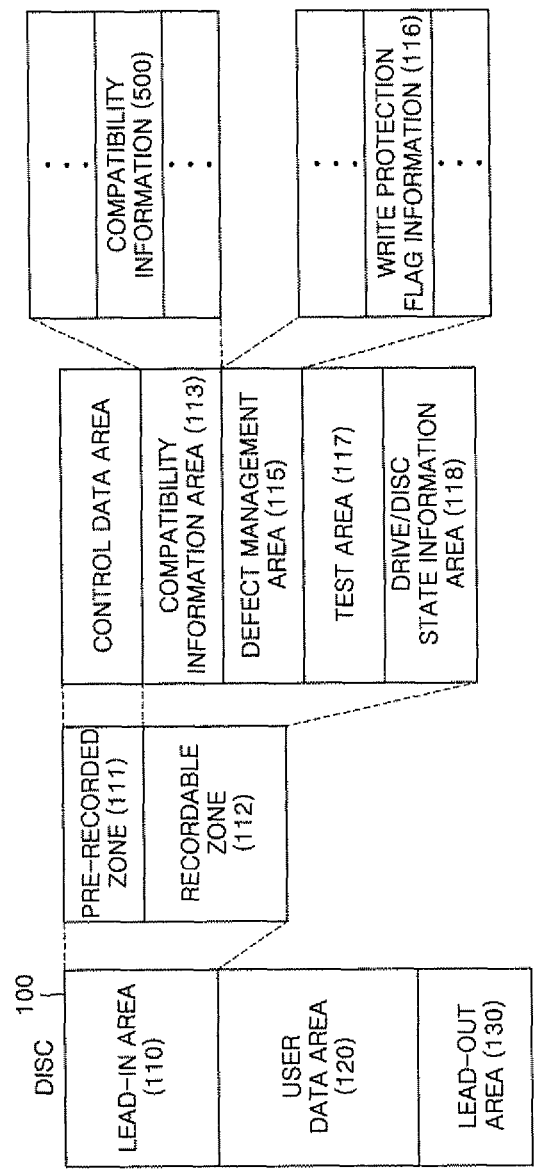
FIG. 4 is a diagram illustrating the structure of a disc according to an embodiment of the present invention.

FIG. 4 is a diagram illustrating the structure of a disc 100 according to an embodiment of the present invention. Referring to FIG. 4, the disc 100 includes a lead-in area 110, a user data area 120, and a lead-out area 130.

The lead-in area 110 includes a pre-recorded zone 111 and a recordable zone 112. The pre-recorded zone 111 is used for storing control data.

Figure 2:
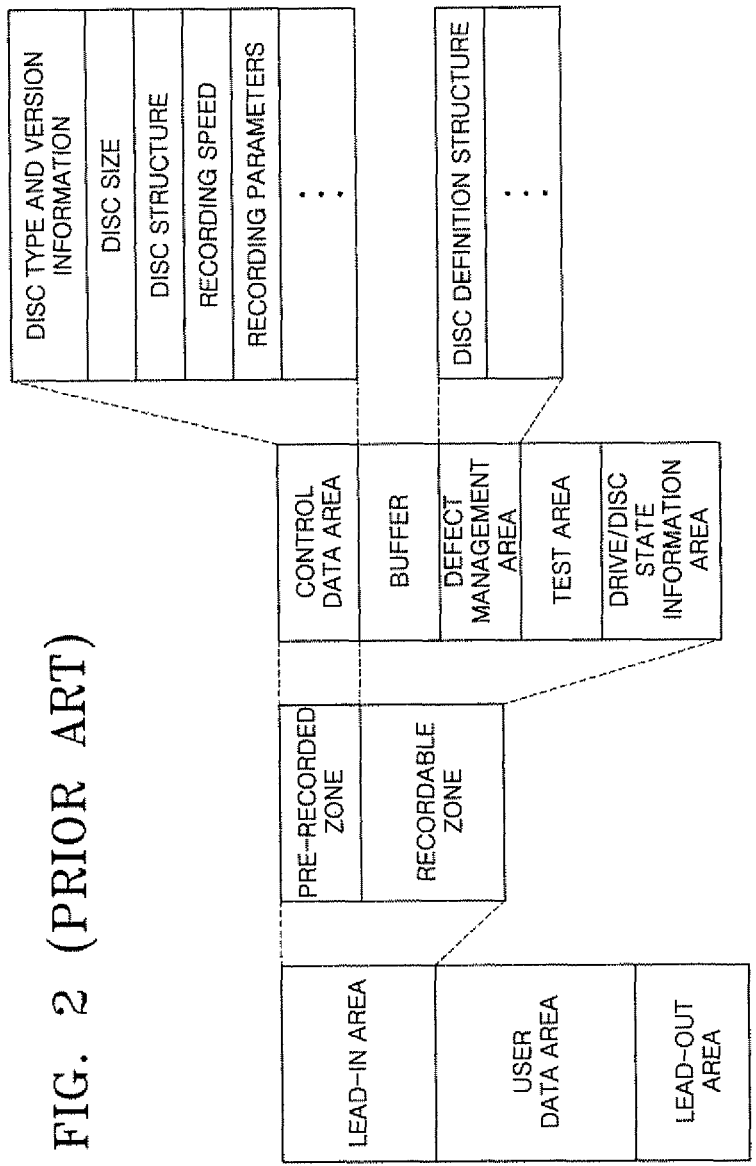
FIG. 2 is a diagram illustrating the structure of a conventional disc.
Figure 3:
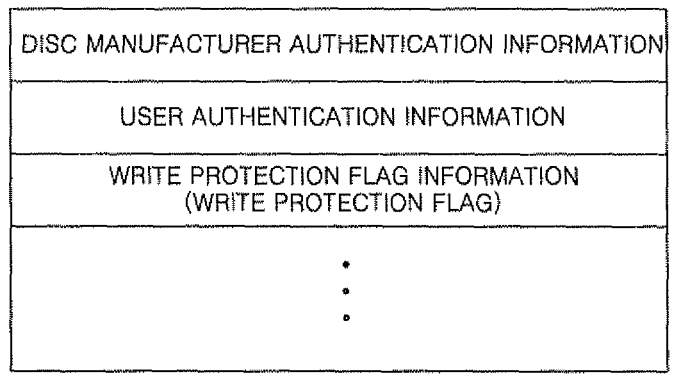
FIG. 3 is a diagram illustrating the structure of a DDS of FIG. 2.

The recordable zone 112 includes a compatibility information area 113, a defect management area (DMA) 115, a test area 117, and a disc/drive state information area 118. The DMA 115 includes a disc definition structure (DDS), in which a write protection flag 116 is recorded. The DMA 115, the test area 117, and the disc/drive state information area 118 have already been described above with reference to FIG. 2. The disc 100 further includes the compatibility information area 113, compared to the conventional disc of FIG. 2.

The compatibility information area 113 includes compatibility information 500. The compatibility information 500 may include one byte or a plurality of bytes. An example of the compatibility information 500, which includes one byte, is illustrated in FIG. 5, and another example of the compatibility information 500, which includes a plurality of bytes, is illustrated in FIG. 6.

Figure 5:
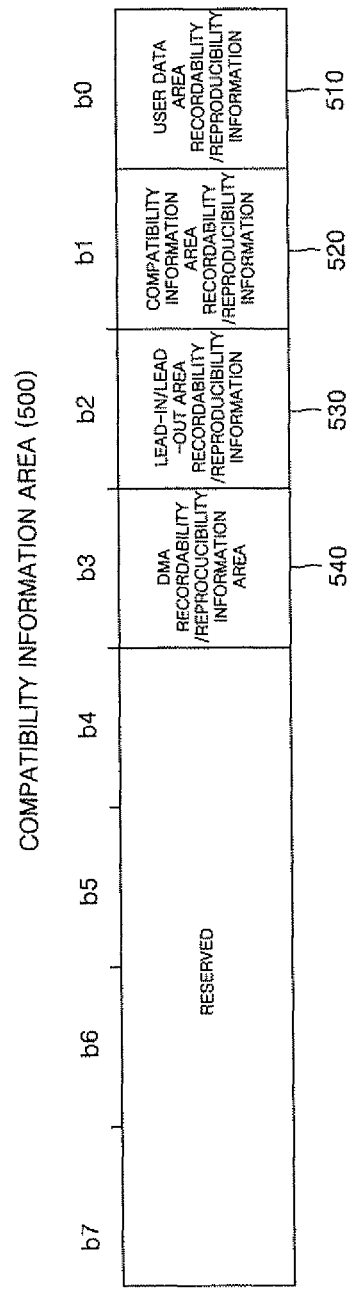
FIG. 5 is a diagram illustrating an example of compatibility information of FIG. 4.

FIG. 5 is a diagram illustrating an example of the compatibility information 500 of FIG. 4. Referring to FIG. 5, the compatibility information 500 is formed of one byte, which includes first through eighth bits b0 through b7. The first bit b0 represents information 510 specifying whether the user data area 120 is recordable and/or reproducible (hereinafter referred to as user data area recordability and/or reproducibility information 510). The second bit b1 represents information 520 specifying whether the compatibility information area 113 is recordable and/or reproducible (hereinafter referred to as compatibility information area recordability and/or reproducibility information 520). The third bit b2 represents information 530 specifying whether the lead-in or lead-out area 110 or 130 is recordable and/or reproducible (hereinafter referred to as lead-in/lead-out area recordability and/or reproducibility information 530). Since the compatibility information area recordability and/or reproducibility information 520 and the DMA recordability and/or reproducibility information 540 are separate, the lead-in or lead-out area 110 or 130 does not include the compatibility information area 113 and the DMA 115. The fourth bit b3 represents information 540 specifying whether the DMA 115 is recordable and/or reproducible (hereinafter referred to as DMA recordability and/or reproducibility information 540). The fifth through eighth bits b4 through b7 are reserved for storing information specifying whether other areas on the disc 100 are recordable and/or reproducible.

The recordability and reproducibility of each of the user data area 120, the compatibility information area 113, the lead-in or lead-out area 110 or 130, or the DMA 115 are specified in Table 1.

TABLE 1

| Compatibility Information | | b7 | b6 | b5 | b4 | b3 | b2 | b1 | b0 |
|---|---|---|---|---|---|---|---|---|---|
| User Data Area | Reproducibility | | | | | | | | 0 |
|  | Recordability | | | | | | | | 1 |
| Compatibility Information Area | Reproducibility | | | | | | | 0 | |
|  | Recordability | | | | | | | 1 | |

TABLE 1-continued

| Compatibility Information | | b7 | b6 | b5 | b4 | b3 | b2 | b1 | b0 |
|---|---|---|---|---|---|---|---|---|---|
| Lead-in/Lead-out Area | Reproducibility | | | | | | 0 | | |
|  | Recordability | | | | | | 1 | | |
| Defect Management Area | Reproducibility | | | | | 0 | | | |
|  | Recordability | | | | | 1 | | | |
| Reserved | | | | | | | | | |

In Table 1, if a predetermined bit of compatibility information has a value of "0", a predetermined area is only reproducible. If the predetermined bit of the compatibility information has a value of "1", the predetermined area is recordable.

In Table 1, the fifth through eighth bits b4 through b7 are reserved for purposes other than indicating whether each of the user data area 120, the compatibility information area 113, the lead-in or lead-out area 110 or 130, and the DMA 115 is recordable and/or reproducible.

The compatibility information 500 may be recorded in at least one of the lead-in area 110 or the lead-out area 130. For enhancing the reliability of the compatibility information 500, the compatibility information 500 may be recorded in both the lead-in area 110 and the lead-out area 130.

The user data area 120, the compatibility information area 113, the lead-in or lead-out area 110 or 130, and the DMA 115 are examples of areas on the disc 100 whose state information, specifying whether they are recordable and/or reproducible, can be included in the compatibility information 500. Thus, even if areas, other than the user data area 120, the compatibility information area 113, the lead-in or lead-out area 110 or 130, and the DMA 115, are newly defined on the disc 100 for supporting new functions, the compatibility information 500 may be modified to further include state information specifying whether each of the newly defined areas is recordable and/or reproducible by modifying firmware of a drive, rather than having to modify hardware of the drive. Accordingly, it is possible to ensure a maximum level of compatibility between the disc 100 and an existing drive or apparatus for recording data on an information recording medium.

If an information recording medium includes more than one layer, it is possible to obtain information of each of the layers, even though a pickup accesses only one of the layers at a time, by recording compatibility information specifying whether each area on each of the layers is recordable and/or reproducible in a lead-in or lead-out area on each of the layers.

In addition, the compatibility information 500 can provide an existing drive with at least basic information on whether each area on a disc is recordable and/or reproducible, regardless of whether the disc is of a higher version than the existing drive. Thus, the compatibility information 500 should be given priority over other information associated with recording and/or reproducing data on and/or from the disc. However, under any circumstances, a drive should always be prevented from recording data on a disc that supports different recording speeds from those supported by the drive.

FIG. 6 is a diagram illustrating another example of the compatibility information 500 of FIG. 4. Referring to FIG. 6, compatibility information 600 includes four bytes, which respectively represent user data area recordability and/or reproducibility information 610, compatibility information area recordability and/or reproducibility information 620, lead-in/lead-out area recordability and/or reproducibility information 630, and DMA recordability and/or reproducibility information 640. Therefore, compatibility information of all areas on the disc 100 can be represented by a plurality of bytes.

Specifically, the compatibility information 600 includes the user data area recordability and/or reproducibility information 610, the compatibility information area recordability and/or reproducibility information 620, the lead-in/lead-out area recordability and/or reproducibility information 630, and the DMA recordability and/or reproducibility information 640. Each of the user data area recordability and/or reproducibility information 610, the compatibility information area recordability and/or reproducibility information 620, the lead-in/lead-out area recordability and/or reproducibility information 630, and the DMA recordability and/or reproducibility information 640 is one byte long and thus can further contain information, other than a corresponding area's state information specifying whether the corresponding area is recordable and/or reproducible.

FIGS. 7A through 7C are diagrams illustrating the DMA recordability and/or reproducibility information 640. Referring to FIGS. 7A through 7C, the DMA recordability and/or reproducibility information 640 includes one byte and contains state information specifying whether the DMA 115 is reproducible, whether the DMA 115 is recordable, and whether the DMA 115 is accessible.

Specifically, as illustrated in FIG. 7A, if a first bit b0 of the DMA recordability and/or reproducibility information 640 has a value of 1, and second through eighth bits b1 through b7 of the section 641 all have a value of 0, then the DMA recordability and/or reproducibility information 640 indicates that the DMA 115 is reproducible.

As illustrated in FIG. 7B, if the second bit b1 of the DMA recordability and/or reproducibility information 640 has a value of 1, and the rest of the DMA recordability and/or reproducibility information 640 have a value of 0, then the DMA recordability and/or reproducibility information 640 indicates that the DMA 115 is recordable.

As illustrated in FIG. 7C, if the third bit b2 of the DMA recordability and/or reproducibility information 640 has a value of 1, and the rest of the DMA recordability and/or reproducibility information 640 have a value of 0, then the DMA recordability and/or reproducibility information 640 indicates that the DMA 115 is non-accessible.

Like the DMA recordability and/or reproducibility information 640 of FIGS. 7A through 7C, the user data area recordability and/or reproducibility information 610, the compatibility information area recordability and/or reproducibility information 620, and the lead-in/lead-out area recordability and/or reproducibility information 630 may contain state information specifying whether their respective areas are reproducible, whether their respective areas are recordable, or whether their respective areas are accessible. In addition, the DMA recordability and/or reproducibility information 640 of FIGS. 7A through 7C can further include state information, other than those illustrated in FIGS. 7A through 7C.

FIG. 8 is a table showing whether a drive can record data on a disc according to a write protection flag recorded in a DDS of the disc and compatibility information specifying whether each area on the disc is recordable and/or reproducible. Referring to FIG. 8, once a write protection flag is set in the DDS of the disc, it is given priority over the compatibility information. Thus, even if a predetermined bit of the compatibility information indicates that a predetermined area is recordable, data is automatically prevented from being recorded in the predetermined area. Therefore, even when a user accidentally makes the compatibility information contradict the write protection flag, data can be prevented from being recorded in the predetermined area, thus guaranteeing safe use of disc storage.

Referring to FIG. 8, if the write protection flag is set in the DDS to have a value of "0", then data can be recorded in the compatibility information area. If the predetermined value of the compatibility information is set to a value of "0", data can be recorded in the predetermined area. Obviously, the write protection flag and the predetermined bit of the compatibility information may be set to a value of "1", other than a value of "0", to indicate that data can be recorded in the predetermined area.

Referring to FIG. 8, if the write protection flag and the predetermined bit of the compatibility information are all set to a value of "0", it is determined that a drive can perform a record operation on the predetermined area. Otherwise, it is determined that the drive cannot perform a record operation on the predetermined area. In other words, only if the write protection flag is set to a value of "0", and the predetermined bit of the compatibility information specifies that the predetermined area is recordable, then it is determined that the drive can perform a record operation on the predetermined area. However, if the write protection flag is set to a value of "1", or the predetermined bit of the compatibility information specifies that the predetermined area is not recordable, and then data is prevented from being recorded in the predetermined area.

FIG. 9 is a schematic block diagram of an apparatus for recording and/or reproducing data on and/or from an information recording medium, according to an embodiment of the present invention Referring to FIG. 9, the apparatus includes a reading and/or writing unit 2 and a control unit 1.

The reading and/or writing unit 2 records and/or reproduces data on and/or from a disc 100, which is an example of the information recording medium according to the present invention. The reading and/or writing unit 2 can be, for example, a pickup.

The control unit 1 controls the operation of the reading and/or writing unit 2 based on a predetermined file system. In particular, the control unit 1 controls the reading and/or writing unit 2 to record compatibility information in a lead-in area or lead-out area of the disc 100, which will be described more fully later.

The control unit 1 includes a system controller 10, a host interface 20, a digital signal processor 30, a radio-frequency (RF) amplifier 40, a servo 50, and a memory 60.

When the disc 100 is loaded in the reading and/or writing unit 2, the system controller 10 of the control unit 1 controls the reading and/or writing unit 2 to read the compatibility information from a compatibility information area, which is defined in the lead-in area or lead-out area of the disc 100. Thereafter, the system controller 10 stores the compatibility information in the memory 60. In addition, the system controller 10 also controls the reading and/or writing unit 2 to read a write protection flag from a DDS, which is defined in a DMA of the disc 100, and then stores the write protection flag.

In the case of recording data in a predetermined area on the disc 100, the host interface 20 receives a write command from a host and transmits the received write command to the system controller 10. The system controller 10 determines whether the predetermined area on the disc 100 is recordable, based on the compatibility information and the write protection flag or based on the compatibility information, the write protection flag, and write inhibit hole information of a cartridge. Here, the write inhibit hole information will be described more fully later with reference to FIG. 12B.

If at least one of the compatibility information and the write protection flag specifies that the predetermined area is not recordable, the system controller 10 transmits an error message, indicating that data cannot be recorded in the predetermined area, to the host via the host interface 20. However, if both the compatibility information and the write protection flag indicate that the predetermined area is recordable, the system controller 10 controls the digital signal processor 30 and the servo 50 to prepare themselves to execute the write command received from the host via the host interface. The digital signal processor 30 receives data to be recorded from the host interface 20, adds additional data, such as parity, to the data to be recorded, and performs error correction code (ECC) encoding on the addition results, thereby generating an ECC block. Thereafter, the digital signal processor 30 modulates the ECC block in a predetermined manner. Then, the RF amplifier 40 converts data output from the digital signal processor 30 into an RF signal. The reading and/or writing unit 2 receives the RF signal from the RF amplifier 40 and records the received RF signal on the disc 100. The servo 50 receives a servo control command from the system controller 10 and servo-controls the pickup of the reading and/or writing unit 2 by executing the received servo control command.

When reproducing data from the predetermined area on the disc 100, the host interface 20 receives a read command from the host. The system controller 10 performs an initialization operation. In the case of reproducing data from the predetermined area, like in the case of recording data in the predetermined area, the system controller 10 references the compatibility information stored in the memory 60. Thereafter, the system controller 10 determines whether the predetermined area is reproducible based on the compatibility information. If the predetermined area is reproducible, the system controller 10 controls the reading and/or writing unit 2 to read data from the predetermined area. The reading and/or writing unit 2 applies a laser beam to the disc 100, receives a laser beam reflected from the surface of the disc 100, converts the received laser beam into an optical signal, and outputs the optical signal to the RF amplifier 40. The RF amplifier 40 converts the optical signal into an RF signal, obtains modulated data from the RF signal, and provides the digital signal processor 30 with the modulated data. In addition, the RF amplifier 40 also obtains a servo signal from the REF signal and provides the servo 50 with the servo signal. The digital signal processor 30 demodulates the modulated data, performs ECC decoding on the demodulated data, and outputs the ECC-decoded data. The servo 50 receives the servo signal from the RF amplifier 40 and receives a servo control command from the system controller 10. Thereafter, the servo 50 servo-controls the pickup of the reading and/or writing unit 2 based on the servo signal and the servo control command. The host interface 20 transmits the ECC-decoded data received from the digital signal processor 30 to the host.

However, if the predetermined area is not reproducible, the system controller 10 transmits an error message, indicating that the predetermined area is not reproducible, to the host via the host interface 20.

The apparatus of FIG. 9, into which an apparatus for recording data on an information recording medium and an apparatus for reproducing data from an information recording medium are integrated, can be divided into two separate apparatuses, i.e., an apparatus for recording data on an information recording medium and an apparatus for reproducing data from an information recording medium.

Figure 10:
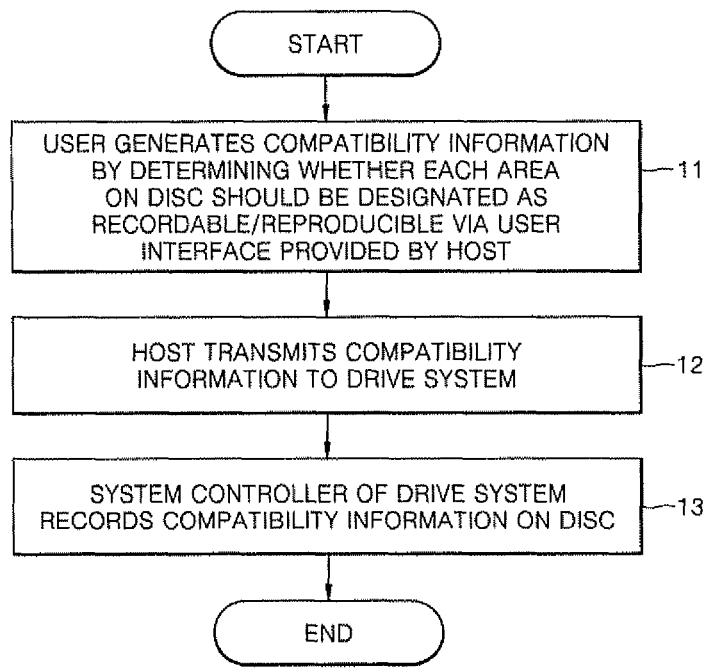
FIG. 10 is a flowchart of a method of recording compatibility information on an information recording medium, according to an embodiment of the present invention.

FIG. 10 is a flowchart of a method of recording compatibility information on an information recording medium, according to an embodiment of the present invention. Referring to FIG. 10, in operation 11, a user generates compatibility information, using a host interface provided by a host, by determining whether each area on a disc should be designated as recordable and/or reproducible. For example, the user may determine whether a user data area, a lead-in or lead-out area, a DMA, and a compatibility information area should be designated as recordable and/or reproducible. In addition, if the disc is yet to be used, the user can generate compatibility information and then record the compatibility information on the disc. If compatibility information has already been recorded on the disc, the user can modify the compatibility information later on.

In operation 12, the host transmits the compatibility information generated by the user to a drive system.

In operation 13, a system controller of the drive system controls the compatibility information to be recorded in a compatibility information area on the disc. For example, the system controller may control the compatibility information to be recorded in a recordable portion of the lead-in area.

Figure 11:
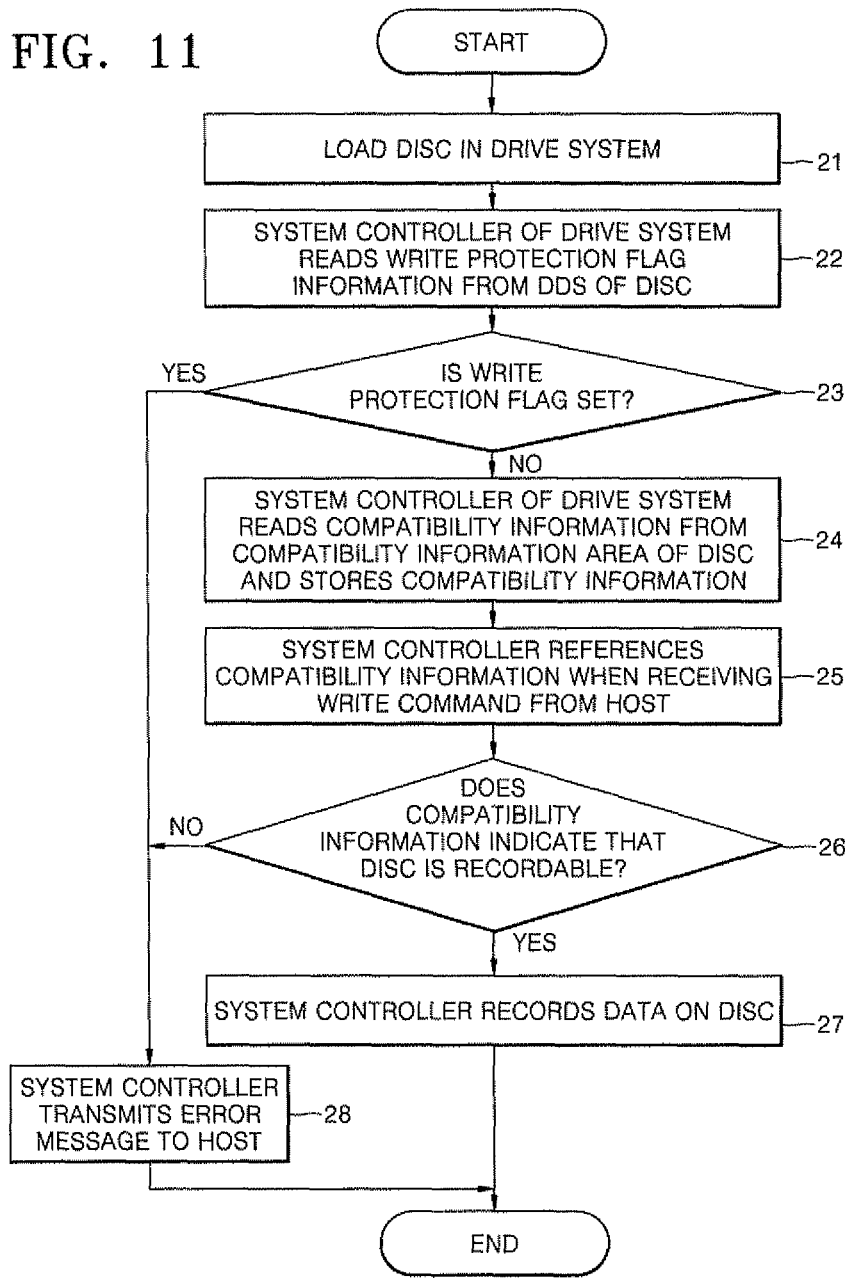
FIG. 11 is a flowchart of a method of recording data on an information recording medium with reference to compatibility information recorded on the information recording medium, according to an embodiment of the present invention.

FIG. 11 is a flowchart of a method of recording data on an information recording medium with reference to compatibility information recorded on the information recording medium, according to an embodiment of the present invention. Referring to FIG. 11, in operation 21, a disc is loaded in a drive system.

In operation 22, a system controller of the drive system reads a write protection flag from a DDS of a DMA on the disc.

In operation 23, the system controller determines whether the write protection flag is set. If the write protection flag is set, the method proceeds to operation 28 because, when set, the write protection flag prevents data from being recorded in a user data area on the disc.

In operation 24, if the write protection flag is yet to be set, the system controller reads compatibility information from a compatibility information area defined in a lead-in or lead-out area of the disc and stores the compatibility information in a memory.

In operation 25, if the drive system receives a write command from a host, the system controller references the compatibility information stored in the memory 60.

In operation 26, the system controller determines whether it can execute the write command on the user data area, based on the compatibility information. In other words, the system controller determines whether data can be recorded in the user data area based on the compatibility information.

In operation 27, if the system controller determines that it can execute the write command on the user data area, based on the compatibility information, the system controller performs a record operation on the user data area. In other words, if the compatibility information indicates that the user data area is recordable, the system controller controls a reading and/or writing unit of the drive system to record data in the user data area.

However, if the user data area is not recordable, the system controller transmits an error message, indicating that the user data area is not recordable, to the host in operation 28. In other words, in operation 28, if the compatibility information indicates that the user data area is not recordable, the system controller 10 transmits the error message to the host.

A method of determining whether data can be recorded on a disc based on a write protection flag of a DDS of the disc, compatibility information recorded in a compatibility information area of the disc, and write inhibit hole information of a cartridge of the disc will now be described more fully with reference to FIGS. 12A through 13.

FIG. 12A is a diagram illustrating the relationship among information on a write inhibit hole of a cartridge (hereinafter referred to as write inhibit hole information), a write protection flag recorded in a DDS of a disc, and compatibility information of the disc. Referring to FIG. 12A, an OR operation is performed on the write inhibit hole information, the write protection flag recorded in the DDS of the disc, and the compatibility information of the disc, and then it is determined whether data is prevented from being recorded on the disc based on the OR operation results.

The write inhibit hole is formed in the cartridge which protects a disc loaded therein. If the write inhibit hole is open, the disc is write-protected so that data cannot be recorded thereon. If the write inhibit hole is closed, data can be recorded on the disc. In other words, the write inhibit hole information specifies whether the write inhibit hole is open or closed. A user can open or shut the write inhibit hole. Therefore, if the user desires to prevent data from being recorded on the disc, he/she can open the write inhibit hole. Then, when the disc is loaded in a drive system, the drive system cannot record data on the disc. If the user desires the disc to be recordable, he/she can shut the write inhibit hole. Then, when the disc is loaded in the drive system, the drive system can record data on the disc.

As described above, the write protection flag of the DDS of the disc also specifies whether the disc is write-protected.

In one aspect of the present invention, if at least one of the write inhibit hole information, the write protection flag recorded in the DDS of the disc, or the compatibility information of the disc indicates that the disc is write-protected, data is prevented from being recorded on the disc. However, the write inhibit hole of the cartridge and the write protection flag recorded in the DDS of the disc are all used for preventing data from being recorded on the entire disc. Thus, if either the write inhibit hole information or the write protection flag indicates that the disc is write-protected, data is prevented from being recorded on the entire disc, regardless of the compatibility information. However, if both the write inhibit hole information and the write protection flag allow data to be recorded on the disc, then it is determined whether to record data on each area on the disc, based on corresponding compatibility information.

Therefore, as long as the write inhibit hole information or the write protection flag is set so that the entire disc can be write-protected, data is prevented from being recorded on any area on the disc, regardless of whether the compatibility information designates a corresponding area on the disc as recordable. Therefore, even when a user accidentally makes the write protection flag, the write inhibit hole information, and the compatibility information contradict one another, data can be prevented from being recorded on the disc.

FIG. 12B is a table showing whether a drive can record data on a disc according to write inhibit hole information, a write protection flag recorded in a DDS of a disc, and compatibility information of the disc. Referring to FIG. 12B, if the write inhibit hole information has a value of "0", a write inhibit hole of a cartridge is closed and the disc is yet to be write-protected. If the write protection flag has a value of "0", a write protection flag is yet to be set so that data still can be recorded on the disc. If a predetermined bit of the compatibility information has a value of "0", a predetermined area on the disc is recordable. Obviously, the write inhibit hole information, the write protection flag, and the predetermined bit of the compatibility information may have a value of "1" to indicate that data still can be recorded on the disc or in the predetermined area on the disc.

Referring to FIG. 12B, it is determined whether the disc is recordable based on a result of performing an OR operation on the write inhibit hole information, the write protection flag, and the compatibility information. Thus, only if the write inhibit hole information, the write protection flag, and the compatibility information are all set to a value of "0", the disc is considered recordable so a drive can record data on the disc. Otherwise, the disc is considered not recordable. In other words, data can be recorded in the predetermined area of the disc only when the write inhibit hole information and the write protection flag are all set to a value of "0", and the compatibility information also designates the predetermined area as recordable. Obviously, although the write inhibit hole information and the write protection flag are all set to a value of "0", data cannot be recorded in the predetermined area on the disc unless the compatibility information designates the predetermined area as not recordable. In addition, if either the write inhibit hole information or the write protection flag is set to a value of "1", data is prevented from being recorded on the entire disc, regardless of the compatibility information.

Figure 13:
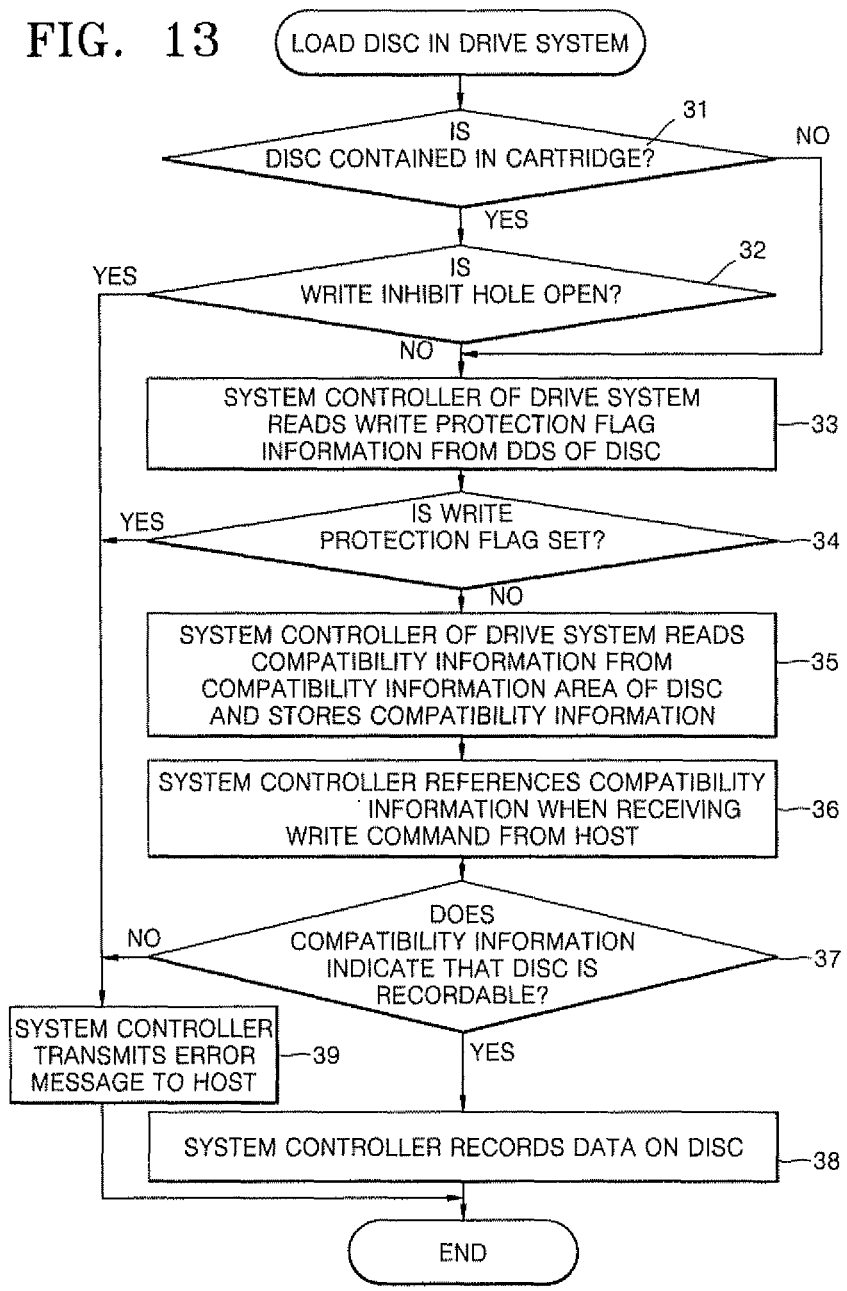
FIG. 13 is a flowchart of a method of recording data on an information recording medium with reference to compatibility information recorded on the information recording medium, according to another embodiment of the present invention.

FIG. 13 is a flowchart of a method of recording data on an information recording medium with reference to compatibility information recorded on the information recording medium, according to another embodiment of the present invention. Referring to FIG. 13, in operation 31, when a disc is loaded in a drive system, the drive system determines whether the disc is contained in a cartridge. If the disc is contained in a cartridge, the method proceeds to operation 33.

In operation 32, if the disc includes a cartridge, the drive system determines whether a write inhibit hole formed at the cartridge is open or closed.

If the write inhibit hole is open, the method proceeds to operation 39, because when open, the write inhibit hole serves to write-protect the disc. In operation 39, a system controller of the drive system transmits an error message to a host.

However, if the write inhibit hole is closed, the method proceeds to operation 33 because when closed, the write inhibit hole allows data to be recorded on the disc. In operation 33, the system controller reads a write protection flag from a DDS in a DMA of the disc.

In operation 34, the system controller determines whether the write protection flag is set. If the write protection flag is set so that data is prevented from being recorded on the disc, the method proceeds to operation 39. In operation 39, the system controller transmits an error message to the host, and then the method is complete.

In operation 35, if the write protection flag is yet to be set so that data still can be recorded on the disc, the system controller reads compatibility information from a compatibility information defined in a lead-in or lead-out area of the disc and stores the compatibility information in a memory.

In operation 36, when the drive system receives a write command from the host, the system controller references the compatibility information stored in the memory.

In operation 37, the system controller determines whether it can execute the write command on the disc based on the compatibility information. For example, when the drive system receives a command to record data in a user data area of the disc from the host, the system controller determines whether data can be recorded in the user data area based on the compatibility information.

In operation 38, if the disc turns out to be recordable, the system controller records data on the disc. In other words, if the compatibility information designates the user data area as recordable, the system controller controls a reading and/or writing unit of the drive system to record data in the user data area.

In operation 39, if the disc turns out to be not recordable, the system controller transmits an error message to the host. In other words, if the compatibility information designates the user data area as reproducible only, the system controller transmits an error message, indicating that the user data area is not recordable, to the host.

The write command is illustrated in FIG. 13 as being received by the drive system in operation 36. However, the write command can be received by the drive system in any operation. In addition, the write inhibit hole information, the write protection flag, and the compatibility information are illustrated in FIG. 13 as being sequentially checked. However, since the order in which the write inhibit hole information, the write protection flag, and the compatibility information are checked is not important, they can be checked in various orders. What is important in the present invention is a result of performing an OR operation on the write inhibit hole information, the write protection flag, and the compatibility information.

The method of recording and/or reproducing data on and/ or from an information recording medium, according to the present invention, may be configured as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for configuring the processing methods can be easily construed by programmers skilled in the art to which the present invention pertains.

As described above, the information recording medium according to the present invention can be completely compatible with an information recording medium, a drive, or an apparatus for recording data on an information recording medium based on a different standard from its own. Therefore, even though an information recording medium is loaded in a drive that is of a lower version than the information recording medium, the drive can smoothly record and/or reproduce data on and/or from the information recording medium with reference to compatibility information read from the information recording medium.

While the present invention has been particularly shown and described with reference to embodiments thereof it will be understood by those of ordinary skill in the art that various changes in form and details may be made therein without departing from the spirit and scope of the present invention as defined by the following claims.

What is claimed is:

1. An information recording medium, comprising:
two recording layers, wherein each of the two recording layers respectively comprises a compatibility information area storing compatibility information;
a user data area; and
a lead-in area comprising the compatibility information area and a defect management area separate from the compatibility information area,
the defect management area configured to store information on replacement data for replacing defective data in the user data area and comprising a write protection flag; and
the compatibility information area configured to store information for performing a predetermined function, and compatibility information for a recording and/or reproducing apparatus which does not recognize the predetermined function, the compatibility information comprising information regarding a basic recording and/ or reproducing function specifying whether each area of a plurality of areas on the information recording medium is recordable and/or reproducible, the information regarding the basic recording and/or reproducing function comprising:
information specifying whether a user data area on the information recording medium is recordable and/or reproducible;
information specifying whether the defect management area on the information recording medium is recordable and/or reproducible; and
information specifying whether the compatibility information area on the information recording medium is recordable and/or reproducible;
wherein even if the compatibility information read from the compatibility information area indicates that the user data area of the information recording medium is recordable, the user data area is write protected in a case where the write protection information read from the defect management area indicates that recording data on the information recording medium is prohibited or write protection information of a cartridge containing the information recording medium indicates write protected, and
wherein if the compatibility information read from the compatibility information area indicates that the user data area of the information recording medium is recordable, the user data area is not write protected in a case where the write protection information read from the defect management area indicates that recording data on the information recording medium is not prohibited and the write protection information of the cartridge containing the information recording medium does not indicate write protected.

2. An apparatus for transferring data with respect to an information recording medium having two recording layers, wherein each of the two recording layers respectively comprises a compatibility information area storing compatibility information, the information recording medium comprising a user data area; and a lead-in area comprising the compatibility information area and a defect management area separate from the compatibility information area, the defect management area configured to store information on replacement data for replacing defective data in the user data area and comprising a write protection flag, and the compatibility information area configured to store information for performing a predetermined function, and compatibility information for a recording and/or reproducing apparatus which does not recognize the predetermined function, the compatibility information comprising information regarding a basic recording and/or reproducing function specifying whether each area of a plurality of areas on the information recording medium is recordable and/or reproducible, the information regarding the basic recording and/or reproducing function comprising information specifying whether a user data area on the information recording medium is recordable and/or reproducible, information specifying whether the defect management area on the information recording medium is recordable and/or reproducible, and information specifying whether the compatibility information area on the information recording medium is recordable and/or reproducible, the apparatus comprising:
a pickup configured to emit a light to transfer data to the information recording medium; and
a control unit configured to:
control the pickup to read the compatibility information from the compatibility information area of one layer of the two recording layers on the information recording medium;
even if the compatibility information read from the compatibility information area indicates that the user data area of the information recording medium is recordable, determine to write protect the user data area on the information recording medium, in a case where the write protection information read from the defect management area indicates that recording data on the information recording medium is prohibited or write protection information of a cartridge containing the information recording medium indicates write protected; and
if the compatibility information read from the compatibility information area indicates that the user data area of the information recording medium is recordable, determine to not write protect the user data area on the information recording medium, in a case where the write protection information read from the defect management area indicates that recording data on the information recording medium is not prohibited and the write protection information of the cartridge containing the information recording medium does not indicate write protected.

3. An information recording medium for use with a recording and/or reproducing apparatus, the information recording medium comprising:
two recording layers, wherein each of the two recording layers respectively comprises a compatibility information area storing compatibility information;
a user data area; and
a lead-in area comprising the compatibility information area and a defect management area separate from the compatibility information area,
the defect management area configured to store information on replacement data for replacing defective data in the user data area and comprising a write protection flag; and
the compatibility information area configured to store information for performing a predetermined function, and compatibility information for the recording and/or reproducing apparatus which does not recognize the predetermined function, the compatibility information comprising information regarding a basic recording and/or reproducing function specifying whether each area of a plurality of areas on the information recording medium is recordable and/or reproducible, the information regarding the basic recording and/or reproducing function comprising:
information specifying whether a user data area on the information recording medium is recordable and/or reproducible;
information specifying whether the defect management area on the information recording medium is recordable and/or reproducible; and
information specifying whether the compatibility information area on the information recording medium is recordable and/or reproducible;
wherein even if the compatibility information read from the compatibility information area indicates that the user data area of the information recording medium is recordable, the user data area is write protected in a case where the write protection information read from the defect management area indicates that recording data on the information recording medium is prohibited, and
wherein if the compatibility information read from the compatibility information area indicates that the user data area of the information recording medium is recordable, the user data area is not write protected in a case where the write protection information read from the defect management area indicates that recording data on the information recording medium is not prohibited.

4. An apparatus for transferring data with respect to an information recording medium having two recording layers, wherein each of the two recording layers respectively comprises a compatibility information area storing compatibility information, the information recording medium comprising a user data area; and
a lead-in area comprising the compatibility information area and a defect management area separate from the compatibility information area, the defect management area configured to store information on replacement data for replacing defective data in the user data area and to store a write protection flag, and the compatibility information area configured to store information for performing a predetermined function, and compatibility information for the apparatus which does not recognize the predetermined function, the compatibility information comprising information regarding a basic recording and/or reproducing function specifying whether each area of a plurality of areas on the information recording medium is recordable and/or reproducible, the information regarding the basic recording and/or reproducing function comprising:
information specifying whether a user data area on the information recording medium is recordable and/or reproducible;
information specifying whether the defect management area on the information recording medium is recordable and/or reproducible; and
information specifying whether the compatibility information area on the information recording medium is recordable and/or reproducible;
the apparatus comprising:
a pickup configured to emit a light to transfer data from the information recording medium; and
a control unit configured to:
control the pickup to read the compatibility information from the compatibility information area of one layer of the two recording layers on the information recording medium;
even if the compatibility information read from the compatibility information area indicates that the user data area of the information recording medium is recordable, determine to write protect the user data area on the information recording medium in a case where the write protection information read from the defect management area indicates that recording data on the information recording medium is prohibited; and
if the compatibility information read from the compatibility information area indicates that the user data area of the information recording medium is recordable, determine not to write protect the user data area on the information recording medium in a case where the write protection information read from the defect management area indicates that recording data on the information recording medium is not prohibited.

* * * * *